United States Patent [19]
Bannister

[11] 4,319,266
[45] Mar. 9, 1982

[54] CHROMA KEYING SYSTEM

[75] Inventor: Richard S. Bannister, Grass Valley, Calif.

[73] Assignee: The Grass Valley Group, Inc., Grass Valley, Calif.

[21] Appl. No.: 217,973

[22] Filed: Dec. 19, 1980

Related U.S. Application Data

[63] Continuation of Ser. No. 71,956, Sep. 4, 1979.

[51] Int. Cl.³ ............................................. H04N 9/535
[52] U.S. Cl. ....................................................... 358/22
[58] Field of Search ........................................... 358/22

[56] References Cited

U.S. PATENT DOCUMENTS 4,160,994 7/1979 Mendrala .............................. 358/22
4,183,045 1/1980 Herrmann et al. .................... 358/22

FOREIGN PATENT DOCUMENTS 2365256 5/1978 France .................................. 358/22

*Primary Examiner*—Richard Murray
*Attorney, Agent, or Firm*—John D. Winkelman

[57] ABSTRACT

A chroma keying system which prevents the production of a chroma key signal when the primary color signals are equal is described. This system effectively prevents chroma keys on monochrome portions of color foreground camera signals. These monochrome portions are typically caused by uneven studio lighting and the resulting shadows and reflections. The system includes a comparator which compares the R, G, and B signals and generates an inhibit signal therefrom. This inhibit signal is then used to prohibit the generation of a chroma key signal.

12 Claims, 6 Drawing Figures

CHROMA KEYING SYSTEM

This is a continuation of application Ser. No. 71,956, filed Sept. 4, 1979.

BACKGROUND OF THE INVENTION

The present invention relates to electronic circuitry for generating special effects in color television and, more particularly, to systems for replacing selected portions of a foreground image with a background image when desired.

Various systems exist for keying out selected portions of a foreground image such as may be provided by a foreground television camera and replacing the keyed out portions with a background image such as may be provided by a background television camera. Examples of such systems are provided by U.S. Pat. No. 3,778,542 for Blue Screen Travelling Matte System granted to L.C. Hanseman on Dec. 11, 1973 and U.S. Pat. No. 3,560,638 granted to Ole Skrydstrup and John D. Ross for Chroma Keying System Utilizing Remote Controlled Chroma Keyer on Feb. 2, 1971.

The Hanseman patent provides an example of a travelling matte system in which the foreground and background signals are algebraically combined such as by use of suppression networks to produce the composite signal. In the particular arrangement disclosed in the Hanseman patent a color difference signal is derived by subtracting the sum of the red and green components of the foreground signal from twice the value of the blue component. The foreground signal is selectively suppressed by a network which acts to subtract the blue component from the total signal. The background signal components are applied to multipliers where they are selectively suppressed by the color difference signal.

The Skrydstrup patent discloses a keying system in which the output is effectively switched between the foreground and background to generate the composite signal. In one embodiment of this invention the nonencoded camera outputs are matrixed to form, R, B, and Y (luminance) signals. These signals are passed through multipliers whose control ports have a d.c. input proportional to the sine and cosine of a hue applied thereto. The outputs of the multipliers are summed to produce the key signal $V_k = (R-Y) \sin \theta + (B-Y) \cos \theta$. The key signal is subsequently delayed by the amount necessary to bring it into the correct time relationship with the encoded background and foreground camera signals. The key signal is then amplified and clipped before it is used to switch between the background and foreground cameras. A clip control is provided to set a threshold below which a key signal is not produced.

The optimum setting of the clip control is dependent upon the ambient lighting conditions in the television production studio. For example, in a studio using a blue background where illumination is uneven, the clip control may have to be set near zero so that all the blue portions of the scene produce a key signal. Thus, it would be possible for the chroma keyer to produce a key from undesired monochrome portions of the foreground signal. These monochrome portions include very dark shadows and bright specularities caused by reflections.

SUMMARY OF THE INVENTION

A chroma key system according to the present invention incorporates certain improvements which inhibit the generation a key signal in response to monochrome portions of the foreground camera signal. In particular, the RGB signals are compared to one another; and when they are equal, the key signal is inhibited. This is based on the well-known fact that during monochrome portions of color television signals the RGB signals are equal.

Thus, it is the object of the present invention to provide a chroma key system that will not produce a key signal in response to monochrome portions of the foreground camera signal.

The invention, however, both as to organization and method of operation, together with further advantages and objects thereof may be best understood by reference to the following description in conjunction with the accompanying drawing figures wherein like reference numerals refer to like elements.

DETAILED DESCRIPTION OF THE PREFERED EMBODIMENT OF THE INVENTION

Figure 1:
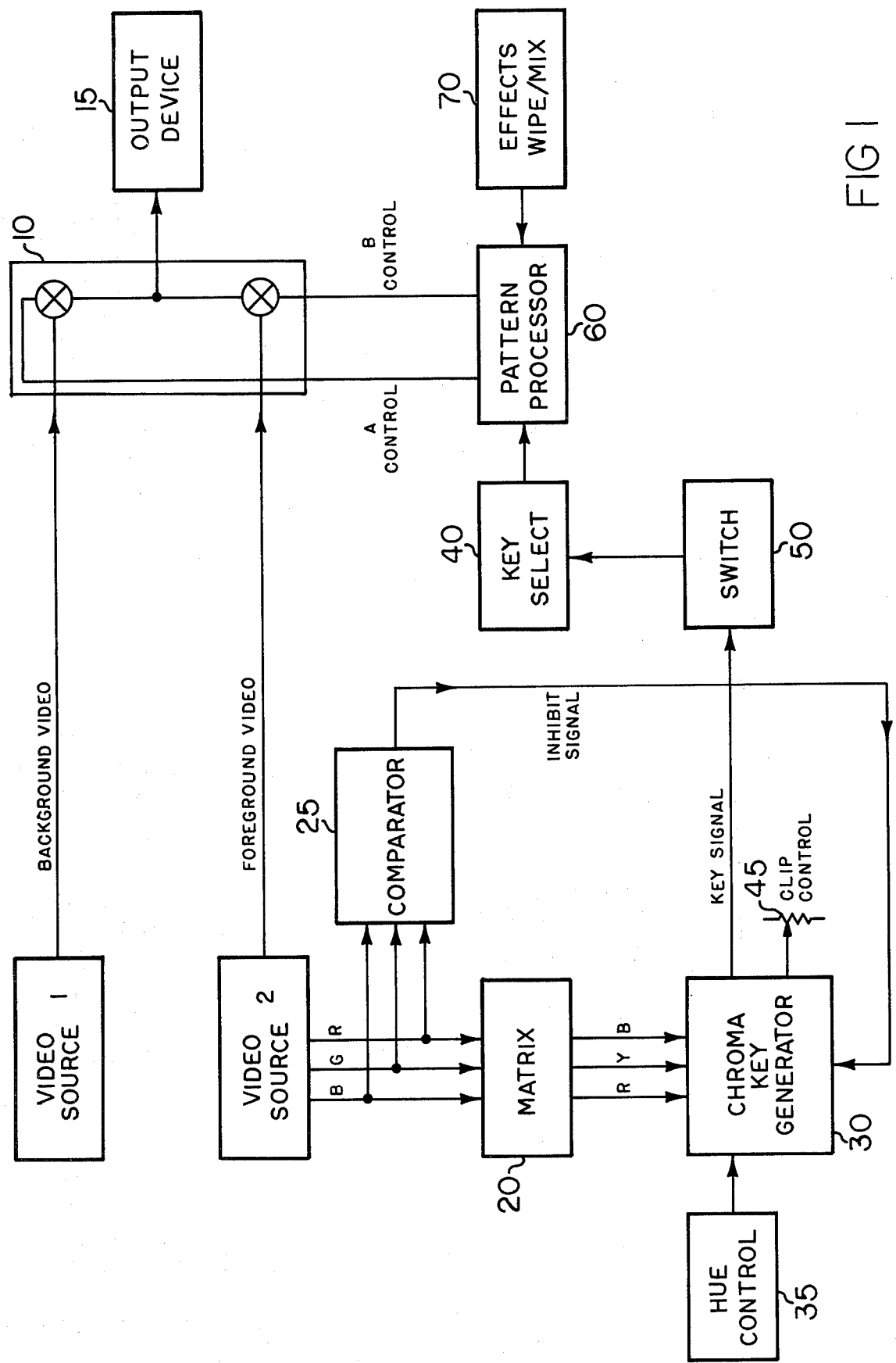
FIG. 1 is a block diagram illustrating how the present invention may be used in a video switching system.

Refer to FIG. 1 wherein I have illustrated in block diagram form a chroma keying system in which the present invention may be utilized. Video signals representative of a background picture being televised originate from a suitable source shown only in block form and designated video source 1; video signals representative of a foreground picture being televised originate from a suitable source shown only in block form and designated video source 2. The video signals originating from video source 1 are encoded composite video signals and are coupled to a means 10 such as a conventional mixer for combining separate input signals linearly in the desired proportion to produce an output signal. The video signals originating from video source 2 define a plurality of signals: encoded composite video coupled to means 10 and the primary color signals red (R), green (G), and blue (B) of the foreground picture. Video source 2 may include a decoder for converting the encoded video to the above primary color signals. An alternate video source, not shown, may be provided to supply additional encoded or primary color signals. Such a source may be a video tape recorder, or the like.

Each of the primary color signals is coupled to a means 20 such as conventional resistive matrix which converts the three primary color signals to two primary color signals and a luminance signal (Y). These signals are next coupled to a means 30 which is a chroma key generator for generating a chroma key signal and may have a remotely operable control means 35 for selecting a color represented by the chroma key signal. Means internal to the chroma key generator 30 utilize the above primary color signals and luminance signal to generate two of the three well-known color difference signals: (B−Y), (R−Y) and (G−Y). The signals generated are, of course, dependent upon the input signals. In the preferred embodiment illustrated in FIG. 1, matrix 20 produces the R, B, and Y signals. Consequently, the color difference signals produced by chroma key generator 30 are (B−Y) and (R−Y). Those skilled in the art are aware that the (R−Y) and (G−Y) difference signals may also be used. Chroma key generator 30 produces the subject difference signals with multipliers whose control ports have a dc input signal proportional to the sine and the cosine of a hue voltage applied thereto. The outputs of these multipliers are summed to produce the chroma key signal: $V_k = (R-Y) \sin \theta + (B-Y) \cos \theta$.

This chroma key generator is well known to those skilled in the art for providing a signal to alternate the input selection of the switching system in accordance with a selected color and is generally operated by a key select means 40 receiving the chroma key signal via switch means 50. The selected chroma key signal is next coupled to a means 60 such as a pattern processor for processing the chroma key signal and other conventional effects applied thereto via the means 70. Outputs A control and B control of processor 60 generated therein in accordance with normal practice, are coupled to mixer 10 to control the combining of the background and foreground video signals generated by video sources 1 and 2 to provide an output signal which is displayed on output device 15.

The above-described system departs from existing systems as hereinafter described to provide an improved chroma keying system. Coupled to receive the RGB signals is means 25 defining a three-level comparator. Comparator 25 produces an inhibit signal when the RGB signals are essentially equal in amplitude. The inhibit signal is subtracted from the key signal and thereby inhibits the chroma keyer from generating a key signal from monochrome portions of the foreground scene.

The present invention takes advantage of the well-known principle that when monochrome television signals are encoded according to the N.T.S.C. color standards, the amplitudes of the individual R, G, and B signals are nearly equal. The principles of N.T.S.C. color encoding are illustrated in the publication *Colour Television, Volume 1 Principles and Practice*, Carnt, P. S., and Townsend, G. B., Iliffe Books Ltd., London: 1961, pp. 78–116, which is herein incorporated by reference.

For a peak white signal, the following color signals exist:

$$R = G = B = 1$$

then $$Y = 0.30(1) + 0.59(1) + 0.11(1) = 1$$

so that $$B - Y = 1 - 1 = 0$$

and $$R - Y = 1 - 1 = 0$$

Similarly, for a grey signal, the following color signals exist:

$$R = G = B = 0.2$$

then $$Y = 0.30(0.2) + 0.59(0.2) + 0.11(0.2) = 0.2$$

so that $$B - Y = 0.2 - 0.2 = 0$$

and $$R - Y = 0.2 - 0.2 = 0$$

The above derivation may be performed for all shades of grey up to black where:

$$R = G = B = 0$$

with similar results. Consequently, all monochrome colors would be located at the origin of the vector diagram of FIG. 2. This diagram illustrates the well-known fact that any color may be defined on a color circle in terms of the two color difference vectors (R−Y) and (B−Y).

Figures 2, 3:
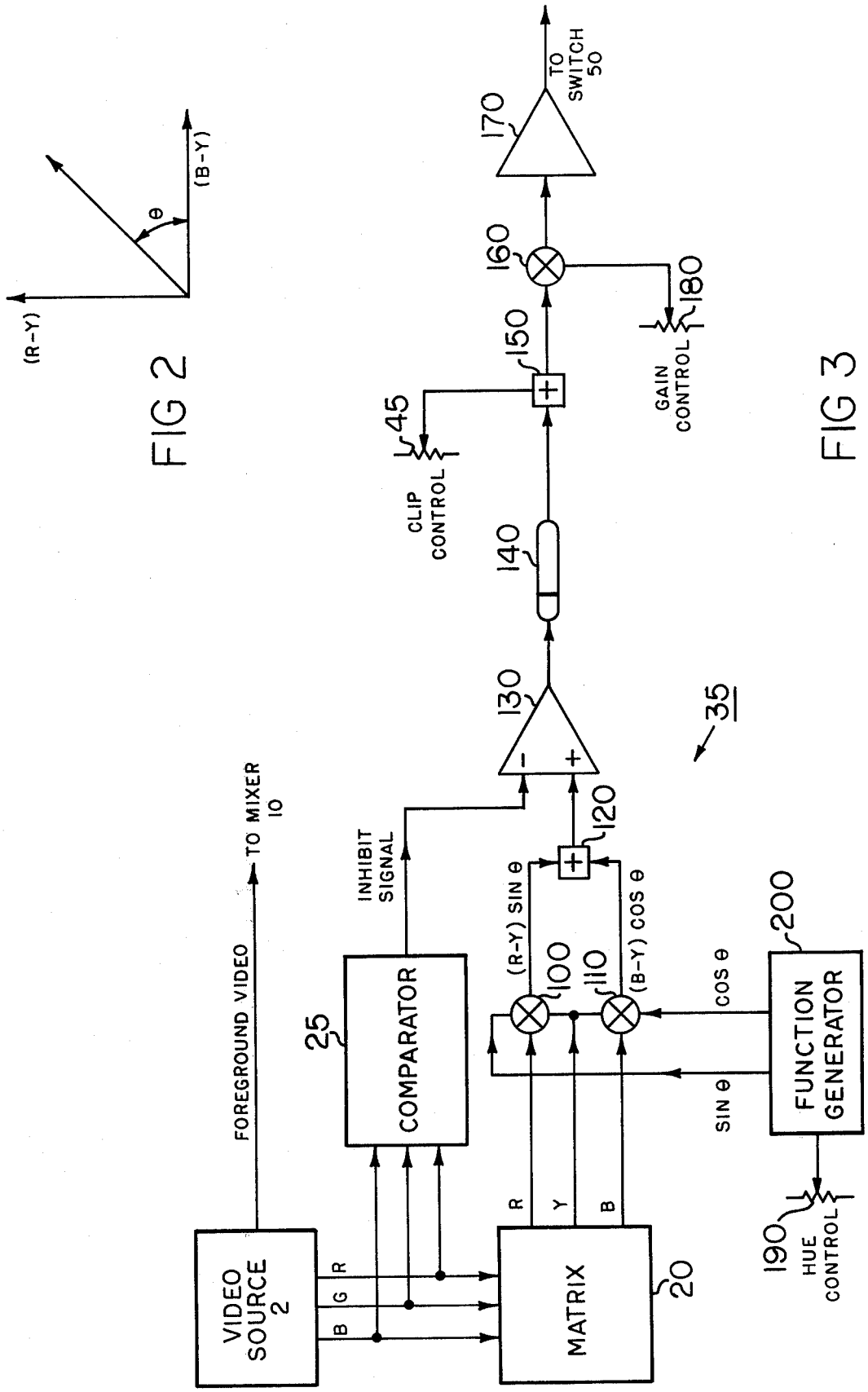
FIG. 2 is a color circle vector diagram illustrating the color difference vectors.
FIG. 3 is a detailed block diagram of the present invention.

Reference should now be made to FIG. 3. wherein I have illustrated in more detail the novel aspects of the present invention. As previously described, the nonencoded RGB signals from video source 2 are coupled to matrix 20 wherein they are transformed into R, B, and Y signals. These signals are combined in multipliers 100 and 110 to produce the well-known color difference signals R−Y and B−Y. These multipliers may be a commercially available type such as a MC1496. These multipliers are controlled by function generator 200. The products of multipliers 100 and 110 are the (R−Y) sin $\theta$ and (B−Y) cos $\theta$ signals. The (R−Y) sin $\theta$ and (B−Y) cos $\theta$ signals are linearly added in adder 120 to obtain the chroma keying signal which has the form:

$$V_k = (R-Y) \sin \theta + (B-Y) \cos \theta$$

which is the equation of a hue on the color circle of FIG. 2. This principle is known from U.S. Pat. No. 3,560,638 granted to Ole Skrydstrup, et al., Feb. 2, 1971, which is incorporated herein by reference. The keying signal is coupled to means 130 which may be an amplifier having both non-inverting and inverting inputs. In which case, the keying signal is coupled to the non-inverting input and an inhibit signal from comparator 25 is coupled to the inverting input. The inhibit signal is produced as a result of comparing the RBG signals. When R=B=G, an inhibit signal is produced and subtracted from the key signal by amplifier 130 to produce a null and thus, disable the chroma key switching function.

If a key signal is produced it is coupled to delay means 140 which is necessary to compensate for encoder delays normally present in television cameras. The delayed key signal is then coupled to gain-controlled multiplier 160. Amplifier 170 amplifies and limits the key signal to approximately one volt.

Figure 4:
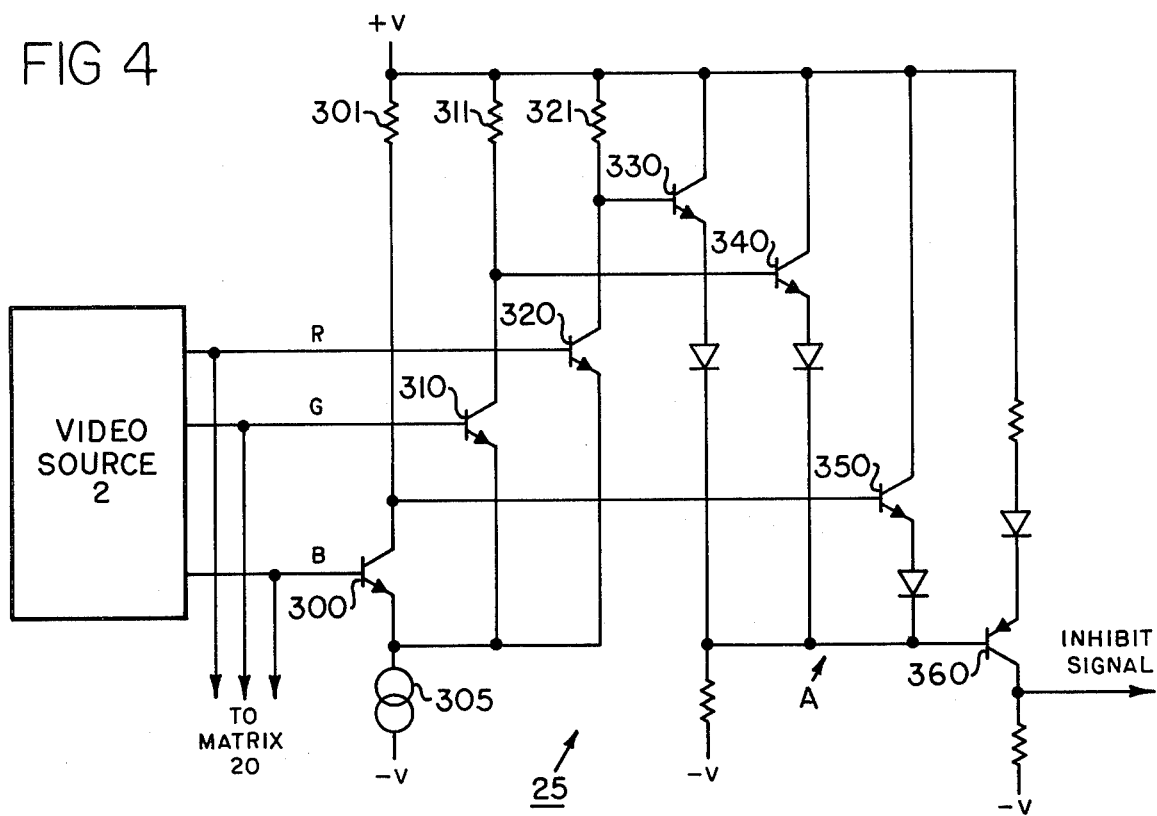
FIG. 4 is a schematic of comparator 25 of FIG. 3.

One embodiment of comparator 25 is shown in schematic form in FIG. 4. The RBG signals from video source 2 are the input signals to comparator 25. The red (R) signal is coupled to the base of NPN transistor 320, the green (G) signal is coupled to the base of NPN transistor 310, and the blue (B) signal is connected to the base of NPN transistor 300. Transistors 300, 310 and 320 are selected to have closely matched operating characteristics. The collector of transistor 300 is connected through resistor 301 to a suitable positive power supply designated +V. The collectors of transistors 310 and 320 are similarly connected, through resistors 311 and 321, respectively, to the same positive power supply, +V. Resistors 301, 311 and 321 are of equal value. The emitter of each transistor 300, 310 and 320 is connected to current source 305 which is, in turn, connected to a suitable negative power supply designated −V. The collector of transistor 300 is connected to the base of NPN transistor 350. The collectors of transistors 310 and 320 are connected to the base of NPN transistors 340 and 330, respectively. Transistors 330, 340 and 350 are selected to have closely matched operating characteristics. The collector of each transistor 330, 340 and 350 is directly connected to the +V power supply. The emitter of each transistor 330, 340, and 350 is connected, through a diode, to a point designated A in FIG. 4 and from there to the −V power supply. Point A is connected to the base of PNP transistor 360, the emitter of which is connected to the +V power supply via a diode and a resistor. The collector of transistor 360 is connected to the −V power supply through a resistor. The output or inhibit signal is taken from the collector of transistor 360.

Figure 5:
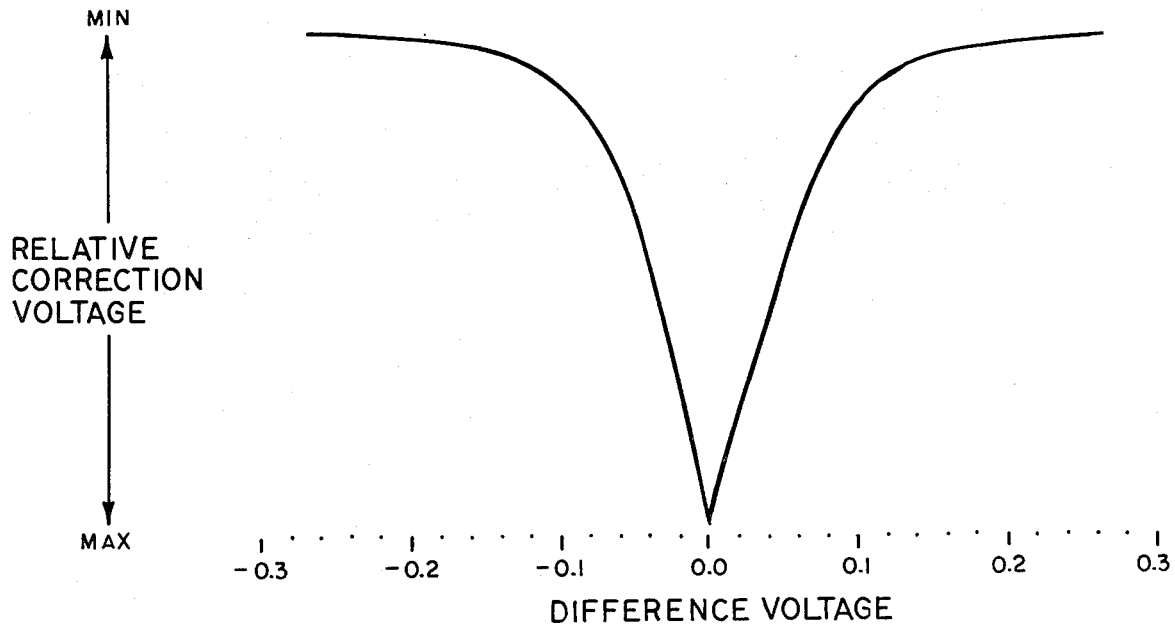
FIG. 5 is a graph of the voltage at point A in FIG. 4.

The above-described circuit functions as a three-level comparator. Since such circuits are well-known to those skilled in the art a detailed description of circuit operation will not be given here. When the RGB signals are equal, the voltage at point A approaches its maximum negative value. FIG. 5 is a graph of the voltage at point A with two of the input signals held constant; for example, R=G, while the B signal is varied from 0.3 volts above to 0.3 volts below the other two signal levels.

When the RGB signals are equal, transistors 300, 310 and 320 draw an equal amount of current from current source 305. Therefore, the base drive to transistors 330, 340, and 350 is equal and the voltage at point A is at its maximum negative value. If, however, the level of one of the signals increases, one of the transistors 300, 310, or 320 draws more current than the other two. This imbalance causes the voltage at point A to rise according to the curve shown in FIG. 5. Transistor 360 inverts the signal at point A before it is fed to amplifier 130.

The above-illustrated case is simplified for the sake of clarity. More complex situations can and do exist in actual operation of the system. But the overall result is the same: when R=G=B, the voltage at point A in FIG. 4 is at its maximum negative value and when the RGB signals differ by more than a few tenths of a volt, the voltage at point A rises to a minimum negative value.

Figure 6:
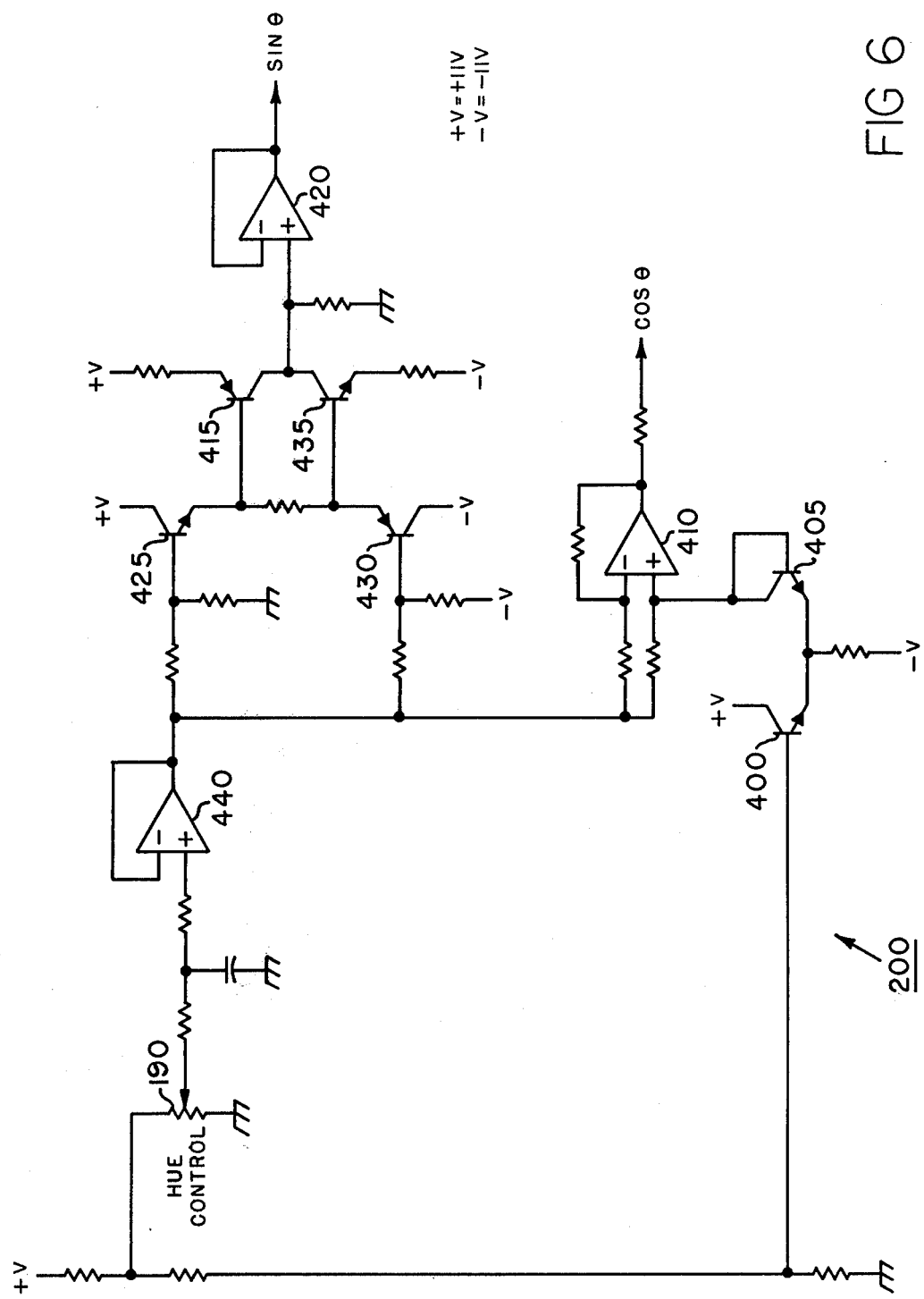
FIG. 6 is a schematic of function generator 200 of FIG. 3.

FIG. 6 is a schematic of one embodiment of function generator 200. Such circuits are well known; therefore only a brief description will be provided herein. The sine and cosine voltages developed by function generator 200 control multipliers 100 and 110. The cosine voltage is developed by transistors 400 and 405 and operational amplifier 410. Amplifier 410 may be a MC1458 or other suitable operational amplifier. With hue control potentiometer 190 at ground, transistor 400 is on and transistor 405 is off. Amplifier 410 then behaves as a non-inverting amplifier with unity gain. As hue control potentiometer 190 is turned to its half-way point, transistor 405 begins conducting and reduces the voltage at the non-inverting input of amplifier 410. This causes amplifier 410 to operate as a inverting amplifier with unity gain. The sine voltage is generated by transistors 415, 425, 430, and 435 and amplifier 420. When the hue control potentiometer 190 is at ground, the base of transistor 425 is at ground and the base of transistor 430 is at approximately −3.3 volts. Also, transistor 415 is saturated and the voltage at the non-inverting input of amplifier 420 is near ground. As the voltage from hue control potentiometer 190 increases, the voltage at the non-inverting input of amplifier 420 follows the voltage at the base of transistor 425 until transistor 415 comes out of saturation. Amplifier 420 now functions a unity gain inverting amplifier until transistor 435 saturates. When transistor 435 saturates, the voltage at the non-inverting input of amplifier 420 again follows the base voltage of transistor 425. The function generator outputs change direction rather abruptly producing a triangular output. However, the points are smoothed by overdriving the control ports of multipliers 100 and 110.

In summary, what has been described is a chroma keying system which prevents the production of a chroma key signal when the RGB signals are equal. This has the effect of preventing chroma keys on monochrome portions of color foreground camera signals. These monochrome portions are typically caused by uneven lighting and reflections.

While there has been shown and described the preferred embodiment of the present invention, it will be apparent to those skilled in the art that many changes and modifications may be made without departing from the invention in its broader aspects. Therefore, the appended claims are intended to cover all such modifications and changes that fall within the scope of the invention.

What I claim as my invention is:

1. A system for switching video signals, comprising
   a first video signal source providing a first video signal having a plurality of color components present in various proportions and representing a first visual image,
   a second video signal source providing a second video signal representing a second visual image,
   means responsive to a selected one of the color components in said first video signal for switching between said first and second signal sources to produce a composite video signal containing image information from both of said sources, and
   means coupled to said first source and to said switching means for comparing the color components of said first video signals and inhibiting switching by said switching means when the proportions of said color components are substantially equal.

2. The system of claim 1, wherein said color components are the red, green ahd blue color components of said signal.

3. The system of claim 2, wherein said comparing and inhibiting means includes a three level color signal comparator.

4. An improved chroma keying system for producing a composite video image signal in accordance with the presence of a selected color component from a source producing multiple color signal components in various proportions, comprising
   at least two video signal sources, including a first source of primary color signals representative of the color content of a first image, and a second source of video signals representative of a second image,
   means coupled to said first source for generating a keying signal in accordance with a selected image color,
   means responsive to said keying signal for selecting between said first and second sources to produce from them a composite video image signal, and means coupled to said first source and to said keying signal generating means for comparing the amplitudes of said primary color signals and inhibiting said keying signal when said amplitudes are approximately equal.

5. The system of claim 4, wherein said primary color signals are unencoded red, green and blue color signals.

6. The system of claim 4, wherein said keying signal generating means includes means responsive to said primary color signals for providing color difference signals, and means for generating keying signals in response to said color difference signals.

7. The system of claim 6, wherein said color difference signals are produced by means including a resistive matrix.

8. An improved chroma keying system for providing a composite video image signal by selective switching of a plurality of video signals in accordance with the presence of a selected color in an image from which one of said plurality of signals is derived, comprising means defining a source of video color signals, including red, green and blue color signals, means coupled to said source for producing a plurality of color difference signals from said red, green and blue signals, means responsive to selected ones of said color difference signals for generating a keying signal, and means coupled to said source and to said signal generating means for comparing said red, green and blue color signals and inhibiting the generation of said keying signal when the amplitudes of said color signals are approximately equal.

9. The system of claim 8, wherein said color difference signals are produced by means including a resistive matrix.

10. The system of claim 8, wherein said comparing and inhibiting means includes a three level color signal comparator.

11. The system of claim 10, wherein said comparator includes means for producing an inhibit signal when said red, green and blue signals are substantially equal in amplitude.

12. The system of claim 11, wherein said keying signal generating means includes means responsive to said inhibit signal for disabling switching of video signals by said system.

* * * * *